(12) United States Patent
Partenheimer

(10) Patent No.: US 6,958,373 B2
(45) Date of Patent: Oct. 25, 2005

(54) TRANSFORMATION OF POLYMERS TO USEFUL CHEMICALS OXIDATION

(75) Inventor: Walter Partenheimer, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/333,646

(22) PCT Filed: Jul. 25, 2001

(86) PCT No.: PCT/US01/23320
§ 371 (c)(1),
(2), (4) Date: Jun. 20, 2003

(87) PCT Pub. No.: WO02/10228

PCT Pub. Date: Feb. 7, 2002

(65) Prior Publication Data
US 2004/0019156 A1 Jan. 29, 2004

Related U.S. Application Data

(60) Provisional application No. 60/221,156, filed on Jul. 27, 2000.

(51) Int. Cl.$^7$ ................................................. C08F 8/06
(52) U.S. Cl. ................... 525/388; 525/370; 525/333.8; 525/361; 525/387
(58) Field of Search ................................ 525/388, 370, 525/333.8, 361, 387

(56) References Cited

U.S. PATENT DOCUMENTS

| | | |
|---|---|---|
| 3,423,382 A | 1/1969 | Chibnik et al. |
| 3,463,767 A | 8/1969 | Bush et al. |
| 5,004,797 A | 4/1991 | Rohrscheid et al. |
| 5,386,055 A | 1/1995 | Lee et al. |
| 5,414,113 A * | 5/1995 | Broeker et al. .............. 562/413 |
| 5,652,311 A * | 7/1997 | Hardy et al. ................. 525/340 |
| 5,753,780 A * | 5/1998 | Stover et al. ................ 525/388 |
| 5,789,636 A | 8/1998 | Holighaus et al. |
| 5,814,707 A * | 9/1998 | Frechet et al. ........... 525/333.3 |
| 5,849,964 A | 12/1998 | Holighaus et al. |
| 5,886,057 A | 3/1999 | Harvie et al. |
| 5,977,193 A | 11/1999 | Corbin et al. |
| 6,018,085 A | 1/2000 | Ponsford et al. |

FOREIGN PATENT DOCUMENTS

| | | |
|---|---|---|
| EP | 0636640 | 2/1995 |
| WO | WO 94/10215 | 5/1994 |

OTHER PUBLICATIONS

Partenheimer, Methodology and scope of metal/bromide autoxidation of hydrocarbons, Catalysis Today, 23, 69–158 (1995).*

Chemical Abstracts, vol. 117 No. 20, Columbes, Ohio, p. 17 XP000376833, 1992.

Toshiaki Yoshioka, Keiichi Furukawa and Akitsugu Okuwaki, Chemical recycling of rigid–PVC by oxygen oxidation in NaOH solutions at elevated temperatures, Polymer Degradation and Stability, 67 (2000) 285–290.

W. Partenheimer, Methodology and scope of metal/bromide autoxidation og hydrocarbons, Catalysis Today, 23 (1995) 69–158.

PCT/US01/23320, International Search Report dated Feb. 22, 2002.

* cited by examiner

Primary Examiner—Ling-Sui Choi

(57) ABSTRACT

Polymeric materials are recycled by transformation to useful chemicals by oxidization in the liquid phase using acetic acid as a solvent and a metal bromide catalyst.

21 Claims, No Drawings

TRANSFORMATION OF POLYMERS TO USEFUL CHEMICALS OXIDATION

This application is a 371 of PCT/US01/23320 filed Jul. 25, 2001 which claims benefit of application Ser. No. 60/221,156 filed Jul. 27, 2000.

FIELD OF INVENTION

The invention relates to a process for the production of useful chemicals from polymers, including salvage or waste polymeric material, comprising contacting the polymeric material with an oxidant in the presence of a metal bromide catalyst. The chemicals produced from the oxidation process can be utilized as monomers, solvents, and chemical intermediates.

BACKGROUND OF THE INVENTION

Every year over 140 billion pounds of polymeric materials are produced worldwide. When polymeric materials reach a post-consumer or post-industrial stage, disposal of the polymeric materials can become a political and social issue in terms of allocation of landfill space and sensitivities to incineration. Recycling polymeric materials is an alternative option to disposal of this material is becoming an increasing problem, with landfill space decreasing and incineration prohibited by environmental regulations. Recyclingdisposal. However, recycling of polymeric materials is difficult due to the commingling of polymers with other materials and the expense expense of chemical reactions such as depolymerization, necessary to produce useful materials from waste polymers.

In view of the foregoing, there is a need for efficient processes to convert polymeric materials without the need to cleanly separate the polymeric materials from other types of material, and that will produce good yields of easily separated, useful products.

Metal bromide catalysts have been used to oxidize many types of nonpolymeric compounds, especially substituted alkylbenzenes to various products including the oxidation of alkyl to aldehydes, alkyl to alcohols, alkyl to acids, alcohol to acid, and aldehydes to acids (W. Partenheimer, *Catalysis Today*, 23(2), 69–158, (1995)). In U.S. Pat. No. 5,414,113 metal bromide catalysts were used as part of a processes to produce terephthalic acid from polyester, but only to oxidize impurities remaining after hydrolytic depolymerization.

SUMMARY OF THE INVENTION

The present invention is directed to a process for the oxidation of polymeric material comprising contacting the polymeric material with an oxidant in the presence of a homogenous metal-catalyst under conditions promoting oxidation of the polymeric material.

The present invention is also directed to a process for the oxidation of polymeric material comprising contacting the polymeric material with an oxidant in the presence of a metal bromide catalyst comprising a source of bromide and at least one metal selected from the group consisting of Ti, V, Cr, Mn, Fe, Co, Ni, Cu, Zr, Ag, Hf, Ru, Te, Mo, Zn and Ce.

DETAILED DESCRIPTION OF THE INVENTION

The invention is directed to an oxidation process for the production of useful chemicals from polymeric material, including salvage or waste polymeric material, comprising contacting the polymeric material with an oxidant in the presence of a metal catalyst, preferably a metal bromide catalyst. The useful chemicals produced can be used in a wide variety of industrial processes; such as but not limited to use as monomers, solvents, and chemical intermediates.

The degree of oxidation in the process of the present invention can be easily controlled by many variables such as temperature, pressure, catalyst concentration, selection of catalyst, and selection of solvent. Control over degrees of oxidation in similar processes is described in the review article by W. Partenheimer, *Catalysis Today*, vol. 23, no. 2, 69–158, (1995), which is incorporated by reference herein. Adjusting the degree of oxidation will allow the skilled person to select the useful chemicals that are produced. If a mild degree of oxidation is chosen, the polymer will become partially oxidized along the polymeric chain producing partially oxidized polymers, typically containing peroxide, alcohol, ketone or aldehyde functional groups which may improve polymer properties. Increasing the degree of oxidation will oxidize the polymeric chain into monomeric units containing carboxylic acids, alcohols, ketones or aldehydes and other compounds with oxygen containing functionalities. Further oxidation will result in monomer units containing largely carboxylic acids. A high degree of oxidation will produce carbon oxides (carbon monoxide and carbon dioxide).

The salvaged or waste polymeric material of the instant invention is herein defined as any polymer that contains a carbon backbone. This includes, but is not limited to, aminoresin, chloropolymer, epoxyresin, fluoropolymer, polyacetylene, polyacrylic, polyamic acid, polyamide, polyamine, polyanhydride, polyazomethine, polybenzimidazole, polybenzoxazole, polycarbodiimide, polycarbonate, polycyanurate, polyester, polyether, polyimide, polyisocyanurate, polyketone, polyolefin, polyphenyl, polyquinoxaline, polystyrene, polysulfonamide, polysulfone, polythioester, polythioether, polyurea, polyurethane, and polyvinyl polymers. Natural protein based and cellulose based polymers are generally not suitable to the processes of the instant invention as they tend to oxidize completely to carbon dioxide and water.

The polymeric materials can be addition or condensation polymers, thermoplastic or thermoset polymers, homopolymers, copolymer or terpolymers, or single polymers or blends thereof. The polymeric material may also be linear, branched or crosslinked. Surface modifications may also be present.

Preferably, the polymeric material is comprised of polyamide, polyester, polyolefin, polycarbonate, or copolymers or blends thereof. Most preferably, the polymeric material is polyester, polyolefin, polyvinylchloride, polycarbonate, or copolymers or blends thereof.

The salvaged or waste polymeric material of the instant invention may be from any source, such as but not limited to wastes from the production of plastics materials, commercial packaging wastes of plastics materials, residues, mixed and pure portions from the plastics-processing industry, waste manufactured or commercial articles, and materials generated from recycling programs. The waste polymeric materials can be in any suitable form including shaped parts, laminates, composite materials, foils or sheets, or synthetic fibers, but may be used in any suitable form. It is preferred that the material be in the form of particles such as pellets, granules, powder or flakes derived from comminution or other mechanical breakdown of manufactured articles or waste material.

Although it is preferred that major impurities such as metal be separated from the salvaged or waste material before use, it may contain impurities such as pigments, glass fibers, fillers such as titanium oxide or zinc oxide, flame-proofing agents, pigment-containing printing inks, adhesives, and paper or other cellulose material. The polymeric material does not have to be cleansed of dirt, food waste, or other contamination present. A particular advantage of the instant invention is that the oxidation will effectively incinerate impurities such as food waste, paper, adhesives, and other organic contaminates often found on waste polymeric products. Inorganic contaminants and solid impurities remaining after oxidation can be easily separated from the final product, usually by filtration.

Any soluble, homogenous metal autoxidation catalyst can be used for the process of the invention. In general, these metal catalysts are chosen from the group consisting of Ti, V, Cr, Mn, Fe, Co, Ni, Cu, Zr, Ag, Hf, Ru, Te, Mo, Zn and Ce.

Each of the metal catalyst components can be provided in any of their known ionic or combined forms. Preferably the metal or metals are in a form that is soluble in the reaction solvent. Examples of suitable metal catalyst forms include, but are not limited to, metal carbonate, metal acetate, metal acetate tetrahydrate, and metal bromide. Preferably metal acetate tetrahydrates are used. Other substances can be added to the metal catalyst such as bromide and NHPI (N-hydroxyphthalimide).

A preferred catalyst for the process of the instant invention is comprised of a source of bromine and at least one metal selected from the group consisting of Co, Mn, Ce, V and Ni, and optionally containing Zr, Hf, Ce, and Ni. More preferably the metal bromide catalyst contains Co or V. The addition of bromide generally increases the activity and selectivity of the catalyst used.

Metal bromide catalysts employed in the process of this invention comprise a soluble transition metal compound and soluble bromine-containing compound, as described in Partenheimer, supra. One metal or a combination of two or more metals may be present. Many such combinations are known and may be used in the processes of the instant invention. These metal bromide catalysts and their preparation are described further in Partenheimer, supra, in particular 9 pages 89–95. Preferably the metal is cobalt and/or manganese, optionally containing zirconium. More preferably, the catalyst is comprised of Co/Mn/Zr/Br in the molar ratios of 1.0/1.0/0.1/2.0. The amount of catalyst in the reaction mixture can be 59/55/203/4 ppm to 5900/5500/20000/390 ppm Co/Mn/Br/Zr, preferably 150/140/510/10 ppm to 2400/2200/8100/160 ppm (g of metal/g of solvent). As used herein, the molar ratio is the ratio of moles of the metals alone, not the metals as in their compound forms.

The source of bromide can be any compound that produces bromide ions in the reaction mixture. These compounds include, but are not limited to, hydrogen bromide, hydrobromic acid, sodium bromide, elemental bromine, benzyl bromide, and tetrabromoethane. Preferred is sodium bromide or hydrobromic acid. As used herein, the amount of bromine means the amount measured as Br. Thus, the molar ratio of bromine to total of the metals used in the catalyst is the moles of Br divided by the sum of the moles of the metal.

An unexpected advantage of the instant invention is the fact that the polymeric material does not have to dissolve in the solvent in order for the process to proceed. As described in Partenheimer, supra, pages 86–88, suitable solvents for use in the processes of the present invention, described above, generally have at least one component that contains a monocarboxylic acid functional group. The processes may be run in a solvent or solvent mixture that does not contain an acid group, provided that one of the reagents does contain such a group. Suitable solvents can also be aromatic acids such as benzoic acid and derivatives thereof. A preferred solvent is an aliphatic $C_2$–$C_6$ monocarboxylic acid, such as but not limited to acetic acid, propionic acid, n-butyric acid, isobutyric acid, n-valeric acid, trimethylacetic acid, and caproic acid and mixtures thereof. Components of said mixtures can include benzene, acetonitrile, heptane, acetic anhydride, chlorobenzene, o-dichlorobenzene, and water. Most preferred as solvent is acetic acid. Another preferred solvent is water. Acetic acid is the usual solvent for the Co/Mn/Zr/Br catalyst.

The oxidant in the processes of the present invention is preferably an oxygen containing gas or gas mixture, such as, but not limited to air. Oxygen by itself is also a preferred oxidant. Other oxidants such as peroxides are also suitable.

A vanadium or vanadium/bromide catalyst can be used with water as a solvent. The amount of vanadium in the reaction mixture can be 100 ppm to 20,000 ppm V, preferably 200 ppm to 14,000 ppm (g of metal/g of solvent). For a vanadium/bromide catalyst the vanadium/bromide in the reaction mixture can be 100/200 to 3000/30,000 ppm, preferably 200/300 to 4000/25,000 ppm.

The processes of the instant invention described above can be conducted in the batch, semi-continuous or continuous mode. Reactors may be a continuously stirred reactor (CSTR) or plug flow reactor. As stated above, the polymeric material does not have to be completely dissolved in the solvent, but can be slurried or agitated. Preferred temperatures are about 50° C. to about 250° C.; more preferred is about 100° C. to about 220° C. In general, increasing reaction time should increase yield. Pressure must be sufficiently high to keep the majority of the liquid in the reactor. If more than one polymeric material is present, they can be separated before the process is conducted, or the products can be separated after the reaction is complete. Separation can be performed by any means known in the art.

The following abbreviations are used herein:

| | |
|---|---|
| BPA | Bisphenol A |
| DMSO | Dimethylsulfoxide |
| GC | Gas chromatography |
| GC/MS | Gas chromatography/mass spectroscopy |

| | |
|---|---|
| LC | Liquid chromatography |
| NDC | 2,6-Naphthalenedicarboxylic acid |
| NHPI | N-hydroxyphthalimide |
| NMR | Nuclear magnetic resonance |
| PABA | 4-Acetoxybenzoic Acid |
| PBT | Poly(butylene)terephthalate |
| PC | Poly(bisphenol A)carbonate |
| PE | Polyethylene |
| PEN | Poly(ethylene)naphthenate |
| PET | Poly(ethylene) terephthalate |
| PHBA | p-Hydroxybenzoic Acid |
| PP | Polypropylene |
| PS | Polystyrene |
| PVC | Polyvinylchloride |
| PVP | Polyvinylpyridine |
| TA | Terephthalic acid |
| THF | Tetrahydrofuran |

The following non-limiting Examples are meant to illustrate the invention but are not intended to limit it in any way.

Materials and Methods

About 0.2–0.5 g of polymer feedstock was placed in 5.2 g of a solution containing cobalt(II) acetate tetrahydrate, manganese(U) acetate tetrahydrate, optionally zirconium (IV) acetate, and sodium bromide in proportions shown, and 0 to 10% water in acetic acid. This was placed in an agitated glass reactor. The reactor was heated to the specified temperature under 1000 psia given pressure of air for the specified amount of time. The reactor was then cooled and its contents prepared for analysis. If solids were present, the solution was filtered before analysis. The solids were air-dried analyzed by NMR and standard elemental analysis methods. The filtrates were analyzed by GC/MS and LC. Yields, unless otherwise specified, were calculated as follows: (100×moles product)/(moles polymer repeat unit).

Terephthalic acid is virtually insoluble in acetic acid/water solutions at room temperature. The terephthalic acid yields from the reactions of PET and PBT, which are insoluble in the solvent used, were based on the amount of isolated solids at room temperature. The yields are estimates only since typically only 0.20 g of polymers was used initially. When co-oxidation of p-xylene with PET was performed, the solids were based on both the terephthalic acid content of the PET as well as the terephthalic acid formed from the p-xylene. The yield of the 2,6-naphthalenedicarboxylic acid formed in the reaction of PEN was determined using the same method as it is also very insoluble in acetic acid/water mixtures.

An estimation of the oligomer present in the solids during polyester oxidation (PET, PBT, PEN) was obtained by dissolving the isolated solids, obtained at the end of the experiment, in deuterated dimethylsulfoxide and obtaining its carbon and hydrocarbon NMR spectrum. The presence of oligomer was evidenced by the peaks at 4.5 tau units. The relative amount of oligomer in the solids was obtained from the integrated area at 4.5 tau units and that of terephthalic acid by the integrated area at 8.0 tau units. The percent oligomer in the solids was thus calculated. PET is virtually insoluble in dimethylsulfoxide. If the sample was only partially soluble in DMSO the percent oligomer is given the 'greater than' sign (>).

EXAMPLES 1–12

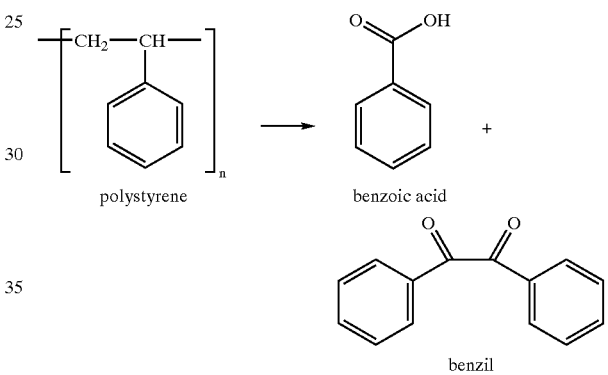

The results from the oxidation of three different sources of polystyrene are given in Table 1. The yields, as high as 73%, vary as a function of time and temperature. At the termination of most of the reactions there are a small amount of solids which are believed to be unreacted PS.

TABLE 1

Oxidation of Polystyrene (PS)

| Ex. | Feedstock | Co/Mn/Br/Zr ppm | Water % | Temp ° C. | Time Hr | Pressure Psi | Initial Conc. Wgt % | Product Yields Mol % |
|---|---|---|---|---|---|---|---|---|
| 1 | (1) | 407/379/1103/20 | 8.0 | 150 | 2 | 1000 | 3.8 | benzoic acid, 7.1 |
|   |     |                 |     |     |   |      |     | benzil, 0.0 |
| 2 | (1) | 407/379/1103/20 | 8.0 | 180 | 2 | 1000 | 3.8 | benzoic acid, 36 |
|   |     |                 |     |     |   |      |     | benzil, 0.49 |
| 3 | (1) | 407/379/1103/20 | 8.0 | 220 | 2 | 1000 | 3.8 | benzoic acid, 73 |
|   |     |                 |     |     |   |      |     | benzil, 0.1 |
| 4 | (1) | 407/379/1103/20 | 8.0 | 220 | 5 | 1000 | 3.8 | benzoic acid, 73 |
|   |     |                 |     |     |   |      |     | benzil, 0.0 |

TABLE 1-continued

Oxidation of Polystyrene (PS)

| Ex. | Feedstock | Co/Mn/Br/Zr ppm | Water % | Temp °C. | Time Hr | Pressure Psi | Initial Conc. Wgt % | Product Yields Mol % |
|---|---|---|---|---|---|---|---|---|
| 5 | (2) | 407/379/1103/0 | 8.0 | 205 | 0.5 | 1000 | 3.8 | benzoic acid, 13 benzil, 0.6 |
| 6 | (2) | 407/379/1103/0 | 8.0 | 205 | 1.0 | 1000 | 3.8 | benzoic acid, 27 benzil, 1.5 |
| 7 | (2) | 407/379/1103/0 | 8.0 | 205 | 2.0 | 1000 | 3.8 | benzoic acid, 52 benzil, 3.0 |
| 8 | (2) | 407/379/1103/0 | 8.0 | 205 | 3.0 | 1000 | 3.8 | benzoic acid, 38 benzil, 2.3 |
| 9 | (3) | 407/379/1103/0 | 8.0 | 205 | 3.0 | 1000 | 3.8 | benzoic acid, 59 benzil, 3.2 |
| 10 | (3) | 407/379/1103/0 | 8.0 | 205 | 3.0 | 1000 | 3.8 | benzoic acid, 60 benzil, 2.5 |
| 11 | (3) | 407/379/1103/0 | 8.0 | 205 | 3.0 | 1000 | 3.8 | benzoic acid, 62 benzil, 1.6 |
| 12 | (3) | 407/379/1103/0 | 8.0 | 205 | 3.0 | 1000 | 3.8 | benzoic acid, 57 benzil, 2.6 |

Polymer sources:
(1) Polystyrene pellets (Aldrich, cat. no. 18,242-7)
(2) Black, rigid polystyrene plate, washed (Boston Market ®, Golden, CO)
(3) Clear, rigid polystyrene cup (Legacy ®)

EXAMPLES 13–16

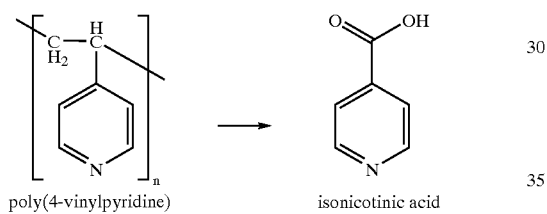

poly(4-vinylpyridine)　　→　　isonicotinic acid

The results of the reaction of Aldrich poly(4-vinylpyridine) (#22,696-3, 2% cross-linked) with air are given in Table 2. White solids were produced which were shown to be isonicotinic acid by NMR analysis. Maximum observed yield was 65%. The yield included the isonicotinic acid from the solids as well as that present in the filtrate.

TABLE 2

Oxidation of poly(4-vinyl)pyridine to isonicotinic acid

| Ex. | Feedstock | Co/Mn/Br/Zr ppm | Water % | Temp °C. | Time hr | Pressure psi | Initial Conc., wgt % | Yield mol % |
|---|---|---|---|---|---|---|---|---|
| 13 | PVP(1) | 407/379/1103/20 | 8 | 150 | 2 | 1000 | 3.68 | 33.3 |
| 14 | PVP(1) | 407/379/1103/20 | 8 | 180 | 2 | 1000 | 3.57 | 65.2 |
| 15 | PVP(1) | 407/379/1103/20 | 8 | 220 | 2 | 1000 | 3.51 | 62.0 |
| 16 | PVP(1) | 407/379/1103/20 | 8 | 220 | 5 | 1000 | 8.71 | 59.3 |

(1)Aldrich poly(4-vinylpyridine) (#22,696-3, 2% cross linked)

EXAMPLES 17–19

Oxidation of PEN produced solids which C,H-NMR analysis indicated were a mixture of 2,6-naphthalenedicarboxylic acid (NDC) and partially oxidized oligomer. Purer NDC can be obtained by using higher temperatures, longer reaction times, or higher catalyst concentrations. Co-oxidation of PEN with toluene and p-xylene produced solids which were shown by C,H-NMR analysis to be mixtures of NDC and benzoic acid, and NDC and terephthalic acid respectively. Only a trace of oligomer was detected in both cases. The data suggests that co-oxidation with methyl aromatic compounds oxidizes PEN more effectively than it is by itself. The conversion of toluene and p-xylene was >99% with 100% of the toluene being converted to benzoic acid. Based on the results of PET, glycolic and acetoxyacetic acid was also formed during PEN oxidation. Results are shown in Table 3.

TABLE 3

Oxidation of polyethylene(naphthenate) (PEN)

| Ex. | Feedstock | Co/Mn/Br/Zr ppm | Water % | Temp/time/ pressure, C., Hr, psi | Init. Conc. Wgt % | NDC yld, mol % | glycolic acid yld, mol % | acetoxyacetic acid, mol % | Foot-notes |
|---|---|---|---|---|---|---|---|---|---|
| 17 | PEN | 407/379/1103/20 | 8 | 190/2/1000 | 3.91 | 100.0 | 1.48 | 3.69 | 1,3 |
| 18 | PEN + toluene | 407/379/1103/20 | 8 | 190/2/1000 | 3.86 | 72.0 | 1.27 | 5.67 | 2,5 |
| 19 | PEN + p-xylene | 407/379/1103/20 | 8 | 190/2/1000 | 3.82 | 100.0 | 1.79 | 11.3 | 3,5 |

1DuPont Kaladex ® PEN film, 1000/340 gauge
2DuPont Kaladex ® PEN film with added 9.4 wgt % toluene
3DuPont Kaladex ® PEN film with added 4.7 wgt % p-xylene
4NMR analysis indicated mixture of 2,6-NDC and oligomer
5NMR analysis indicated 2,6-NDC with trace of oligomer

EXAMPLES 20–28

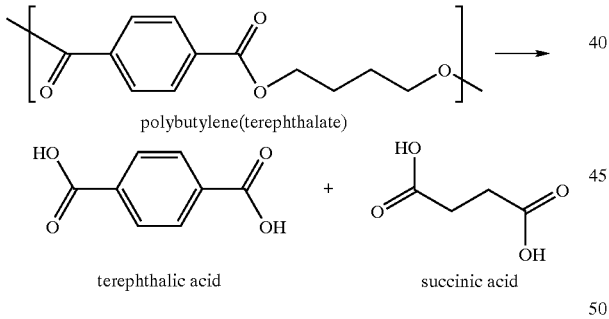

polybutylene(terephthalate)

terephthalic acid        succinic acid

Results are shown in Table 4. Oxidation of PBT for 2 hrs produced solids, which upon C,H-NMR analysis d that they were a mixture of terephthalic acid (TA) and a trace of oligomer. Co-oxidation of PBT with toluene and p-xylene for 2 hrs produced solids which upon C,H-NMR analysis indicated that the recovered solids were only terephthalic acid (TA). All of the other solids reported on Table 1 contained a mixture of TA and oligomer. The data indicates that longer reaction times decreased the amount of oligomer in the solids obtained after reaction. The conversion of toluene and p-xylene in these experiments were >99% with 100% of the toluene being converted to benzoic acid. Products from PBT should additionally yield tetrahydrofuran by cyclization and succinic acid by oxidation.

TABLE 4

Oxidation of Polylbutylene(terephthalate)

| Ex. | Feedstock | Co/Mn/Br/Zr ppm | Water % | Temp °C. | Time hr | Pressure psi | Initial Conc., wgt % | Yield mol % | Succinic acid, mol % | Foot- notes |
|---|---|---|---|---|---|---|---|---|---|---|
| 20 | PBT | 407/379/1103/20 | 8 | 190 | 2 | 1000 | 3.77 | 51.1 | 16.6 | 1,5 |
| 21 | PBT + toluene | 407/379/1103/20 | 8 | 190 | 2 | 1000 | 3.56 | 83.6 | 18.3 | 1,2,6 |
| 22 | PBT + p-xylene | 407/379/1103/20 | 8 | 190 | 2 | 1000 | 3.49 | 84.8 | 17.50 | 1,3,6 |
| 23 | PBT | 407/379/1103/20 | 8 | 190 | 1 | 1000 | 4.49 | N/A | 8.10 | 1 |
| 24 | PBT + toluene | 407/379/1103/20 | 8 | 190 | 1 | 1000 | 3.88 | N/A | 14.0 | 1,2 |
| 25 | PBT + p-xylene | 407/379/1103/20 | 8 | 190 | 1 | 1000 | 3.72 | N/A | 19.4 | 1,3 |
| 26 | PBT | 407/379/1103/20 | 8 | 190 | 0.5 | 1000 | 4.9 | 85.5 | 2.8 | 1,4 |
| 27 | PBT + toluene | 407/379/1103/20 | 8 | 190 | 0.5 | 1000 | 4.29 | 56.0 | 6.7 | 1,2,4 |
| 28 | PBT + p-xylene | 407/379/1103/20 | 8 | 190 | 0.5 | 1000 | 3.75 | 82.6 | 9.9 | 1,3,4 |

1Crastin ® 6134 PBT (E.I. DuPont de Nemours, Wilmington, DE) Intrinsic viscosity is 0.75 to 0.8.
2Crastin ® 6134 PBT with added 9.4 wgt % toluene
3Crastin ® 6134 PBT with added 4.7 wgt % p-xylene
4NMR analysis indicated mixture of TA and oligomer
5NMR analysis indicated TA with trace of oligomer
6NMR analysis indicated only TA present.

EXAMPLES 29–97

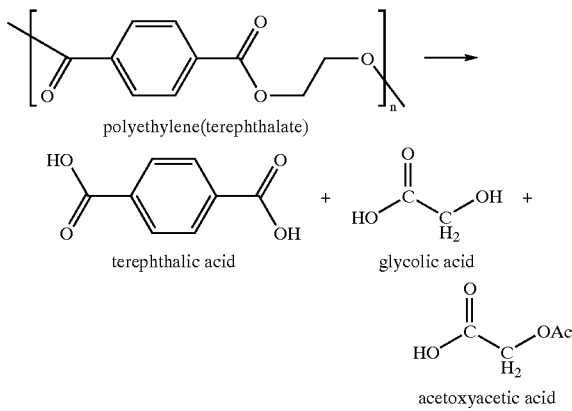

The PET samples were oxidized by themselves and co-oxidized with toluene and p-xylene. Liquid GC analysis of the filtrates indicated that the conversion of p-xylene and toluene (when present) were greater than 100%. Benzoic acid yield (when toluene was present) was nearly 100%.

The description of the reactions is given in Table 5 and the results in Table 6. The table exemplifies that more efficient conversion of PET to terephthalic acid occurs at 1) higher temperatures, 2) longer residence times, 3) higher initial PET concentrations, 4) co-oxidation with toluene and 5) co-oxidation with p-xylene.

The oxidation of cotton and paper was also evaluated in Comparative Examples 87–97. These samples were initially insoluble in the initial catalyst/acetic acid solution. After the oxidation, there were no solids remaining and it is assumed that the cotton and paper was oxidized to carbon oxides (carbon dioxide and carbon monoxide). This illustrates that fibers, such as clothes, that contain PET, when oxidized will result in solids that are essentially terephthalic acid.

TABLE 5

Oxidation of Polyethylene(terephthalate) (PET)

| Ex. | Feedstock | Type Of PET | Co/Mn/Br/Zr ppm | Water % | Temp °C. | Time hr | Pressure psi | Initial Conc. wgt % | [co-oxidant] wgt % |
|---|---|---|---|---|---|---|---|---|---|
| 29 | PET | blue film | 407/379/1103/0 | 8 | 205 | 1.0 | 1000 | 8.53 | 0.00 |
| 30 | PET + p-xylene | blue film | 407/379/1103/0 | 8 | 205 | 1.0 | 1000 | 4.26 | 2.36 |
| 31 | PET + p-xylene | blue film | 407/379/1103/0 | 8 | 205 | 1.0 | 1000 | 4.26 | 2.36 |
| 32 | PET | blue film | 407/279/1103/0 | 8 | 205 | 1.0 | 1000 | 8.53 | 0.00 |
| 33 | PET | lid | 407/379/1103/0 | 8 | 205 | 0.5 | 1000 | 3.93 | 0.00 |
| 34 | PET + p-xylene | lid | 407/379/1103/0 | 8 | 205 | 0.5 | 1000 | 4.03 | 4.72 |
| 35 | PET | lid | 407/379/1103/0 | 8 | 205 | 1.0 | 1000 | 4.01 | 0.00 |
| 36 | PET + p-xylene | lid | 407/379/1103/0 | 8 | 205 | 1.0 | 1000 | 3.75 | 4.75 |
| 37 | PET | lid | 407/379/1103/0 | 8 | 205 | 2.0 | 1000 | 3.76 | 0.00 |
| 38 | PET + p-xylene | lid | 407/379/1103/0 | 8 | 205 | 2.0 | 1000 | 3.87 | 4.69 |
| 39 | PET | lid | 407/379/1103/0 | 8 | 205 | 3.0 | 1000 | 3.94 | 0.00 |
| 40 | PET + p-xylene | lid | 407/379/1103/0 | 8 | 205 | 3.0 | 1000 | 4.11 | 4.92 |

TABLE 5-continued

Oxidation of Polyethylene(terephthalate) (PET)

| Ex. | Feedstock | Type Of PET | Co/Mn/Br/Zr ppm | Water % | Temp °C. | Time hr | Pressure psi | Initial Conc. wgt % | [co-oxidant] wgt % |
|---|---|---|---|---|---|---|---|---|---|
| 41 | PET | blue film | 407/379/1103/0 | 8 | 205 | 1.0 | 1000 | 4.01 | 0.00 |
| 42 | PET | blue film | 407/379/1103/0 | 8 | 205 | 1.0 | 1000 | 7.69 | 0.00 |
| 43 | PET | blue film | 407/379/1103/0 | 8 | 205 | 1.0 | 1000 | 11.51 | 0.00 |
| 44 | PET | blue film | 407/379/1103/0 | 8 | 205 | 1.0 | 1000 | 15.25 | 0.00 |
| 45 | PET | blue film | 407/379/1103/0 | 8 | 205 | 1.0 | 1000 | 19.03 | 0.00 |
| 46 | PET + p-xylene | blue film | 407/379/1103/0 | 8 | 205 | 1.0 | 1000 | 3.79 | 2.18 |
| 47 | PET + p-xylene | blue film | 407/379/1103/0 | 8 | 205 | 1.0 | 1000 | 7.64 | 6.18 |
| 48 | PET + p-xylene | blue film | 407/379/1103/0 | 8 | 205 | 1.0 | 1000 | 11.39 | 9.15 |
| 49 | PET | blue film | 407/379/1103/0 | 8 | 205 | 0.5 | 1000 | 3.75 | 0.00 |
| 50 | PET | blue film | 407/379/1103/0 | 8 | 205 | 0.5 | 1000 | 3.82 | 0.00 |
| 51 | PET + p-xylene | blue film | 407/379/1103/0 | 8 | 205 | 0.5 | 1000 | 3.81 | 4.82 |
| 52 | PET + p-xylene | blue film | 407/379/1103/0 | 8 | 205 | 0.5 | 1000 | 3.88 | 4.80 |
| 53 | PET | blue film | 407/379/1103/0 | 8 | 205 | 1.0 | 1000 | 3.80 | 0.00 |
| 54 | PET | blue film | 407/379/1103/0 | 8 | 205 | 1.0 | 1000 | 3.85 | 0.00 |
| 55 | PET + p-xylene | blue film | 407/379/1103/0 | 8 | 205 | 1.0 | 1000 | 3.87 | 4.80 |
| 56 | PET + p-xylene | blue film | 407/379/1103/0 | 8 | 205 | 1.0 | 1000 | 4.74 | 4.74 |
| 57 | PET | blue film | 407/379/1103/0 | 8 | 205 | 1.5 | 1000 | 3.78 | 0.00 |
| 58 | PET | blue film | 407/379/1103/0 | 8 | 205 | 1.5 | 1000 | 3.80 | 0.00 |
| 59 | PET + p-xylene | blue film | 407/379/1103/0 | 8 | 205 | 1.5 | 1000 | 3.77 | 4.81 |
| 60 | PET + p-xylene | blue film | 407/379/1103/0 | 8 | 205 | 1.5 | 1000 | 3.85 | 4.73 |
| 61 | PET | blue film | 407/379/1103/0 | 8 | 205 | 1.0 | 1000 | 3.81 | 0.0 |
| 62 | PET | barium | 407/379/1103/0 | 8 | 205 | 1.0 | 1000 | 3.90 | 0.0 |
| 63 | PET + toluene | blue film | 407/379/1103/0 | 8 | 205 | 1.0 | 1000 | 3.86 | 9.4 |
| 64 | PET + p-xylene | barium | 407/379/1103/0 | 8 | 205 | 1.0 | 1000 | 3.80 | 5.1 |
| 65 | PET + p-xylene | blue film | 407/379/1103/0 | 8 | 205 | 1.0 | 1000 | 3.89 | 5.1 |
| 66 | PET | barium | 407/379/1103/0 | 8 | 205 | 1.0 | 1000 | 3.91 | 0.0 |
| 67 | PET | barium | 407/379/1103/0 | 8 | 205 | 1.0 | 1000 | 3.78 | 5.1 |
| 68 | PET + toluene | barium | 407/379/1103/0 | 8 | 205 | 1.0 | 1000 | 3.82 | 9.4 |
| 69 | PET + p-xylene | barium | 407/379/1103/0 | 8 | 205 | 1.0 | 1000 | 3.80 | 5.1 |
| 70 | PET + p-xylene | barium | 407/379/1103/0 | 8 | 205 | 1.0 | 1000 | 3.88 | 5.1 |
| 71 | PET | blue film | 407/379/1103/0 | 8 | 205 | 1.0 | 1000 | 3.81 | 0.0 |
| 72 | PET | blue film | 407/379/1103/0 | 8 | 205 | 1.0 | 1000 | 3.88 | 0.0 |
| 73 | PET + toluene | blue film | 407/379/1103/0 | 8 | 205 | 1.0 | 1000 | 3.86 | 9.4 |
| 74 | PET + p-xylene | blue film | 407/379/1103/0 | 8 | 205 | 1.0 | 1000 | 4.89 | 5.1 |
| 75 | PET + p-xylene | blue film | 407/379/1103/0 | 8 | 205 | 1.0 | 1000 | 4.82 | 5.1 |
| 76 | PET | recycled resin | 407/379/1103/20 | 8 | 190 | 2.0 | 1000 | 3.93 | 0.00 |
| 77 | PET + toluene | recycled resin | 407/379/1103/20 | 8 | 190 | 2.0 | 1000 | 4.02 | 9.43 |
| 79 | PET + p-xylene | recycled resin | 407/379/1103/20 | 8 | 190 | 2.0 | 1000 | 4.34 | 4.80 |
| 80 | PET | recycled resin | 407/379/1103/20 | 8 | 190 | 1.0 | 1000 | 4.13 | 0.00 |
| 81 | PET + toluene | recycled resin | 407/379/1103/20 | 8 | 190 | 1.0 | 1000 | 4.15 | 9.43 |
| 82 | PET + p-xylene | recycled resin | 407/379/1103/20 | 8 | 190 | 1.0 | 1000 | 3.95 | 5.96 |
| 83 | PET | recycled resin | 407/379/1103/20 | 8 | 190 | 0.5 | 1000 | 4.13 | 0.00 |
| 84 | PET + toluene | recycled resin | 407/329/1103/20 | 8 | 190 | 0.5 | 1000 | 3.96 | 9.43 |
| 85 | PET + p-xylene | recycled resin | 407/379/1103/20 | 8 | 190 | 0.5 | 1000 | 3.86 | 4.97 |
| 86 | PET | shirt | 407/379/1103/20 | 8 | 150 | 2.0 | 1000 | 2.82 | 0 |
| 87 | cotton | — | 407/379/1103/0 | 8 | 150 | 2.0 | 1000 | — | — |
| 88 | paper | — | 407/379/1103/0 | 8 | 150 | 2.0 | 1000 | — | — |
| 89 | PET | shirt | 407/379/1103/0 | 8 | 180 | 2.0 | 1000 | 3.16 | 0 |
| 90 | cotton | — | 407/379/1103/20 | 8 | 180 | 2.0 | 1000 | — | — |
| 91 | paper | — | 407/379/1103/20 | 8 | 180 | 2.0 | 1000 | — | — |
| 92 | PET | shirt | 407/319/1103/20 | 8 | 220 | 2.0 | 1000 | 3.05 | 0 |
| 93 | cotton | — | 407/379/1103/20 | 8 | 220 | 2.0 | 1000 | — | — |
| 94 | paper | — | 407/319/1103/20 | 8 | 220 | 2.0 | 1000 | — | — |
| 95 | PET | shirt | 407/379/1103/20 | 8 | 220 | 5.0 | 1000 | 3.86 | 0 |
| 96 | cotton | — | 407/379/1103/20 | 8 | 220 | 5.0 | 1000 | — | — |
| 97 | paper | — | 407/379/1103/20 | 8 | 220 | 5.0 | 1000 | — | — |

Polymer sources:
PET blue film: scrap NuPET ® x-ray film containing blue anthraquinone dye. E.I. DuPont de Nemours, Wilmington DE
PET scrap white film filled with 18% barium sulfate. It also contains 137 ppm Mn, 2.6 ppm Sr and 300 ppm Sb. E.I. DuPont de Nemours, Wilmington DE
Lid: Clear rigid plate lid, Boston Market ®, Golden, CO, washed before use.
Shirt: Used TownCraft white shirt composed of 50% Fortrel ® polyester and 50% combed cotton.
Ground, recycled PET bottle resin: from Reprise Technology, EVC Compounds Ltd., Cheshire, UK

TABLE 6

Results from the Co/Mn/Br catalyzed Oxidation of Polyethylene(terephthalate) (PET)

| Ex. | Feedstock | TA Yield % | Glycolic Acid Yld % | Acetoxyacetic Acid Yld, % | % Oligomer In Solids |
|---|---|---|---|---|---|
| 29 | PET | 76.7 | — | — | >26 |
| 30 | PET + p-xylene | 66.9 | — | — | 7.8 |
| 31 | PET + p-xylene | 77.7 | — | — | 3.0 |
| 32 | PET | 79.3 | — | — | 2.9 |
| 33 | PET | 63.4 | 1.29 | 5.58 | >32 |
| 34 | PET + p-xylene | 85.3 | 2.61 | 6.51 | 7.5 |
| 35 | PET | 63.7 | 0.81 | 2.02 | 20.2 |
| 36 | PET + p-xylene | 88.5 | 1.31 | — | 0 |
| 37 | PET | 76.5 | 0.83 | 5.91 | 10.3 |
| 38 | PET + p-xylene | 89.0 | 0.88 | 4.54 | 1.3 |
| 39 | PET | 85.3 | 0.35 | 2.61 | 3.2 |
| 40 | PET + p-xylene | 90.6 | 0.61 | 2.87 | 1.1 |
| 41 | PET | 77.9 | — | — | 30.0 |
| 42 | PET | 79.9 | — | — | 18.2 |
| 43 | PET | 86.4 | — | — | 12.3 |
| 44 | PET | 87.2 | — | — | 5.9 |
| 45 | PET | 88.4 | — | — | 3.8 |
| 46 | PET + p-xylene | 136.3 | — | — | 9.0 |
| 47 | PET + p-xylene | 116.8 | — | — | — |
| 48 | PET + p-xylene | 81.5 | — | — | 4.6 |
| 49 | PET | 66 | 1.78 | 4.64 | >33 |
| 50 | PET | 64 | 0.69 | 1.78 | >29 |
| 51 | PET + p-xylene | 87 | 1.76 | 3.80 | 1.7 |
| 52 | PET + p-xylene | 86 | 1.55 | 2.24 | 0.6 |
| 53 | PET | 60 | 1.47 | 3.66 | >33 |
| 54 | PET | 68 | 1.23 | 5.62 | 22.8 |
| 55 | PET + p-xylene | 85 | 0.37 | 3.80 | 4.9 |
| 56 | PET + p-xylene | 81 | 0.35 | 0.24 | 3.9 |
| 57 | PET | 67 | 1.72 | 5.00 | 27.6 |
| 58 | PET | 72 | 1.07 | 5.30 | 23.2 |
| 59 | PET + p-xylene | 82 | 1.69 | 4.40 | 4.6 |
| 60 | PET + p-xylene | 86 | 1.60 | 4.83 | 6.0 |
| 61 | PET | 89.6 | 1.83 | 5.16 | 29.0 |
| 62 | PET | 73.9 | 1.25 | 5.08 | >21 |
| 63 | PET + toluene | 106.6 | — | — | 9.9 |
| 64 | PET + p-xylene | 83.3 | — | — | 2.1 |
| 65 | PET + p-xylene | 87.8 | — | — | 0.6 |
| 66 | PET | 71.4 | — | — | >29 |
| 67 | PET | 67.5 | 1.49 | 7.02 | >23 |
| 68 | PET + toluene | 105.9 | — | — | >16 |
| 69 | PET + p-xylene | 88.1 | — | — | 3.6 |
| 70 | PET + p-xylene | 90.1 | 1.39 | 4.90 | 3.0 |
| 71 | PET | 73.4 | | | >37 |
| 72 | PET | 74.0 | 0.92 | 7.95 | 33.6 |
| 73 | PET + toluene | 105.9 | — | — | 26.5 |
| 74 | PET + p-xylene | 92.3 | — | — | 8.0 |
| 75 | PET + p-xylene | 89.2 | 0.68 | 3.29 | 10.3 |
| 76 | PET | 75.1 | 0.91 | 6.41 | >25 |
| 77 | PET + toluene | 66.7 | 0.22 | 1.54 | 4.4 |
| 79 | PET + p-xylene | 82.4 | 0.21 | 1.41 | 0.3 |
| 80 | PET | 86.0 | — | — | >38 |
| 81 | PET + toluene | 99.8 | — | — | >17 |
| 82 | PET + p-xylene | 83.7 | — | — | 8.2 |

TABLE 6-continued

Results from the Co/Mn/Br catalyzed Oxidation of Polyethylene(terephthalate) (PET)

| Ex. | Feedstock | TA Yield % | Glycolic Acid Yld % | Acetoxyacetic Acid Yld, % | % Oligomer In Solids |
|---|---|---|---|---|---|
| 83 | PET | 88.1 | — | — | >37 |
| 84 | PET + toluene | 108.7 | — | — | >8 |
| 85 | PET + p-xylene | 70.3 | — | — | >10 |
| 86 | PET | 190.8 | — | — | — |
| 87 | cotton | — | — | — | — |
| 88 | paper | — | — | — | — |
| 89 | PET | 84.5 | — | — | 25.5 |
| 90 | cotton | — | — | — | — |
| 91 | paper | — | — | — | — |
| 92 | PET | 93.6 | — | — | 0.0 |
| 93 | cotton | — | — | — | — |
| 94 | paper | — | — | — | — |
| 95 | PET | 95.1 | — | — | 0.0 |
| 96 | cotton | — | — | — | — |
| 97 | paper | — | — | — | — |

EXAMPLES 98–105

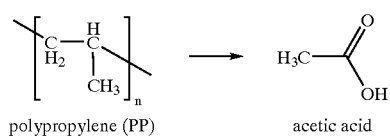

polypropylene (PP) → acetic acid

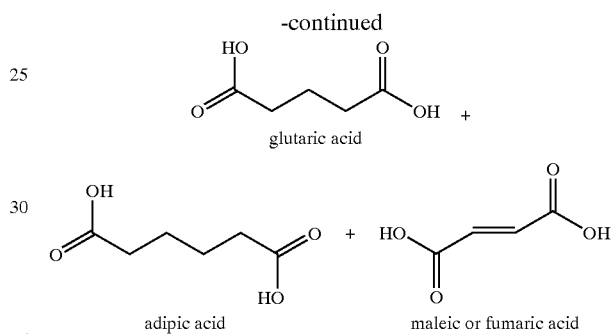

glutaric acid + adipic acid + maleic or fumaric acid

Aldrich polypropylene (#42,811-6, Average $M_w$, 12,000, Average $M_n$=5,000, viscosity at 190 C, 6.0 poise, density 0.902, m.p. 157 C, fine powder) was oxidized and the results given in Table 7. Yields to acetic acid as high as 70% are observed.

TABLE 7

Oxidation of Polypropylene (PP) to Acetic acid

| Ex. | Feedstock | Co/Mn/Br/Zr ppm | Water % | Temp ° C. | Time hr | Pressure psi | Initial Conc. wgt % | Conversion % | Yield % | Foot Note |
|---|---|---|---|---|---|---|---|---|---|---|
| 98 | PP | 407/379/1103/0 | 0 | 150 | 2 | 1000 | 7.55 | — | 26 | 1 |
| 99 | PP | 407/379/1103/0 | 0 | 180 | 2 | 1000 | 7.55 | — | 70 | 1 |
| 100 | PP | 407/379/1103/0 | 0 | 220 | 2 | 1000 | 9.43 | 73 | 14 | 2 |
| 101 | PP | 407/379/1103/0 | 0 | 220 | 2 | 1000 | 18.87 | 45 | 23 | 2 |
| 102 | PP | 407/379/1103/0 | 0 | 150 | 6 | 1000 | 9.43 | 96 | 56 | 2 |
| 103 | PP | 407/379/1103/0 | 0 | 180 | 4 | 1000 | 9.43 | 91 | 57 | 2 |
| 104 | PP | 407/379/1103/0 | 0 | 120 | 2 | 1000 | 7.55 | — | 20 | 3 |
| 105 | PP | 407/379/1103/0 | 0 | 180 | 2 | 1000 | 7.55 | — | 22 | 3 |

1 Yield determined by performing reaction in deuteroacetic acid and adding an internal standard (toluene) and measuring its hydrogen NMR spectrum. Conversion of polypropylene is determined by isolated weight of unreacted polypropylene after reaction.
2 Yield determined by weight gain after subtracting the amount of water formed in reaction.
3 Yield determined by performing the reaction in propionic acid and measuring the amount of acetic acid formed by liquid GC.

EXAMPLES 106–113

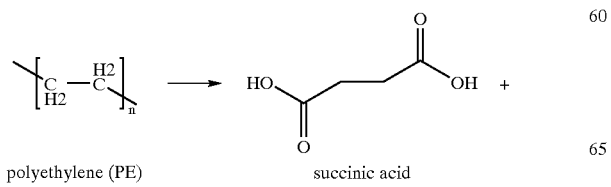

polyethylene (PE) → succinic acid +

Aldrich 33/211-9 polyethylene (medium density/ m.p. 109–111° C./ d0.940/fine powder) was oxidized to significant yields of succinic/glutaric and adipic acids, see Table 8.

TABLE 8

Oxidation of Polyethylene (PE) to Succinic, fumaric, glutaric and adipic acids

| Ex. | Feedstock | Co/Mn/Br/Zr ppm | Water % | Temp ° C. | Time hr | Pressure psi | Init. Conc. Wgt % | Succinic, Yld, % | Fumaric, Yld, % | Glutaric, Yld, % | Adipic, Yld, % |
|---|---|---|---|---|---|---|---|---|---|---|---|
| 106 | polyethylene | 407/379/1103/20 | 8 | 150 | 2 | 1000 | 3.86 | 11.76 | 0.18 | 10.04 | 7.05 |
| 107 | polyethylene | 407/379/1103/20 | 8 | 150 | 2 | 1000 | 7.67 | 10.36 | 0.14 | 6.51 | 8.12 |
| 108 | polyethylene | 407/379/1103/20 | 8 | 180 | 2 | 1000 | 3.88 | 15.36 | 0.10 | 4.68 | 1.08 |
| 109 | polyethylene | 407/379/1103/20 | 8 | 180 | 2 | 1000 | 7.69 | 8.91 | 0.43 | 0.46 | 5.04 |
| 110 | polyethylene | 407/379/1103/20 | 8 | 220 | 2 | 1000 | 3.82 | 0.00 | 0.00 | 0.00 | 0.00 |
| 111 | polyethylene | 407/379/1103/20 | 8 | 220 | 2 | 1000 | 7.63 | 1.47 | 0.10 | 1.06 | 1.24 |
| 112 | polyethylene | 407/379/1103/20 | 8 | 220 | 5 | 1000 | 3.84 | 13.12 | 0.34 | 3.13 | 0.21 |
| 113 | polyethylene | 407/379/1103/20 | 8 | 220 | 5 | 1000 | 7.62 | 6.79 | 0.27 | 4.80 | 4.20 |

EXAMPLES 114–115

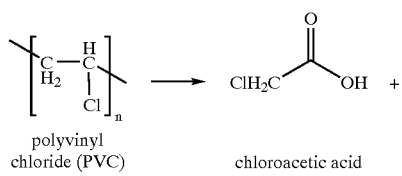

polyvinyl chloride (PVC) → chloroacetic acid

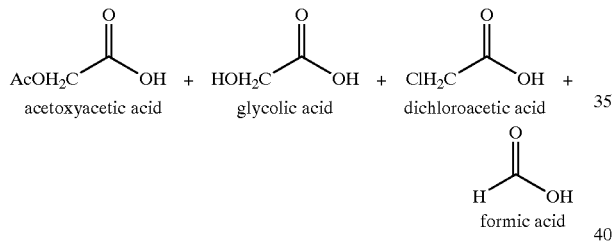

AcOH$_2$C-C(=O)-OH + HOH$_2$C-C(=O)-OH + ClH$_2$C-C(=O)-OH +
acetoxyacetic acid    glycolic acid    dichloroacetic acid H-C(=O)-OH
formic acid Conditions and results are shown in Tables 9 and 10. Polyvinylchloride used was Aldrich #18,261-3, a fine powder with an inherent viscosity of 1.26, density of 1.385 and a molecular weight of 300,000. The mono- and di-chloroacetic acid was formed by the chlorine, from the PVC, reacting with the acetic acid solvent. The PVC also catalyzed the oxidation of the acetic acid to acetoxyacetic acid and glycolic acid.

TABLE 9

Oxidation of Polyvinylchloride to Chloroacetic acid, Glycolic acid, Acetoxyacetic acid, Dichloroacetic acid and Formic acid

| Ex. | Feedstock | Co/Mn/Br/Zr ppm | Water % | Temp ° C. | Time hr | Pressure psi | Initial Conc. wgt % |
|---|---|---|---|---|---|---|---|
| 114 | PVP | 407/379/1103/0 | 0 | 180 | 2 | 1000 | 7.65 |
| 115 | PVP | 407/379/1103/0 | 0 | 210 | 2 | 1000 | 7.77 |

TABLE 10

| Ex. | Chloroacetic Acid Yld, % | Acetoxyacetic Acid Yld, % | Glycolic Acid Yld, % | Formic Acid Yld, % |
|---|---|---|---|---|
| 114 | 35 | 8.0 | 3.3 | 12.5 |
| 115 | 14 | 0.0 | 0.0 | 0.86 |

EXAMPLES 116–123

Results from the oxidation of poly(bisphenol A carbonate) to p-hydroxybenzoic acid and 4-acetoxybenzoic acid are given on Table 11. The yields were based on the analysis of the filtrates only. There were substantial amounts of solids after the reaction which were not been analyzed. The poly (bisphenol A carbonate) was obtained from Aldrich #43,512-0.

TABLE 11

Oxidation of Poly(bisphenol A)carbonate to p-Hydroxybenzoic acid (PHBA), 4-acetoxybenzoic acid (PABA) and Bisphenol A (BPA)

| Ex. | Feedstock | Co/Mn/Br/Zr ppm | Water % | Temp °C. | Time hr | Pressure psi | Init. Conc. Wgt % | 4-PHBA yld % | PABA yld, % | BPA yld % |
|---|---|---|---|---|---|---|---|---|---|---|
| 116 | PBAC | 407/379/1103/20 | 8 | 150 | 2 | 1000 | 7.62 | 0.06 | 0.00 | 3.61 |
| 117 | PBAC | 407/379/1103/20 | 0 | 180 | 5 | 1000 | 7.30 | 4.85 | 0.73 | 0.82 |
| 118 | PBAC | 407/379/1103/20 | 10 | 180 | 5 | 1000 | 7.04 | 10.3 | 0.15 | 0.71 |
| 119 | PBAC | 407/379/1103/20 | 8 | 180 | 2 | 1000 | 7.67 | 6.63 | 0.43 | 1.52 |
| 120 | PBAC | 407/379/1103/20 | 0 | 220 | 2 | 1000 | 7.45 | 6.91 | 0.50 | 3.58 |
| 121 | PBAC | 407/379/1103/20 | 10 | 220 | 2 | 1000 | 7.39 | 10.1 | 0.0 | 1.23 |
| 122 | PBAC | 407/379/1103/20 | 8 | 220 | 2 | 1000 | 7.69 | 9.26 | 0.100 | 0.290 |
| 123 | PBAC | 407/379/1103/20 | 8 | 220 | 5 | 1000 | 8.03 | 9.37 | 0.088 | .245 |

EXAMPLES 124–129

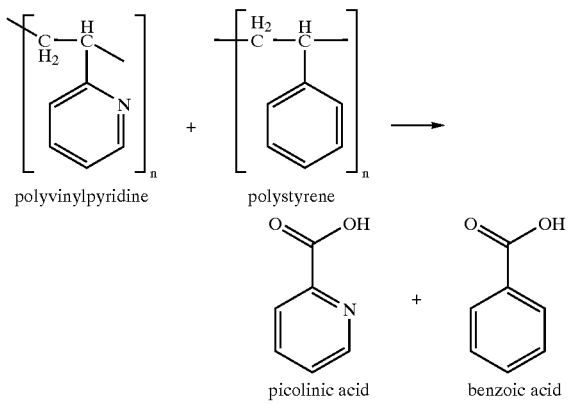

Oxidation of 2-poly(vinyl)pyridine co-polymerized with 30% styrene is given on Table 12. Poly(2-vinylpyridine-co-styrene) was Aldrich #18,460,-8 which was granular with an average Mw of approximately 220,000 having a styrene content of 30%. Results of the reaction is given on Table 12. There were substantial amounts of solids after the reaction which had not been analyzed.

TABLE 12

Oxidation of 2-poly(vinyl)pyridine co styrene to Benzoic acid and Picolinic acid

| Ex. | Feedstock | Co/Mn/Br/Zr ppm | Water % | Temp °C. | Time Hr | Pressure Psi | Solids | Benzoic Acid Yld | Piccolinic Acid Yld |
|---|---|---|---|---|---|---|---|---|---|
| 124 | PVP/PS | 407/379/1103/20 | 8 | 150 | 2 | 1000 | 3.86 | 10.23 | 0.61 |
| 125 | PVP/PS | 407/379/1103/20 | 8 | 150 | 2 | 1000 | 13.18 | 1.26 | 0.45 |
| 126 | PVP/PS | 407/379/1103/20 | 8 | 180 | 2 | 1000 | 3.84 | 20.81 | 4.32 |
| 127 | PVP/PS | 407/379/1103/20 | 8 | 220 | 2 | 1000 | 3.79 | 80.99 | 1.47 |
| 128 | PVP/PS | 407/379/1103/20 | 8 | 220 | 2 | 1000 | 13.39 | 20.25 | 0.18 |
| 129 | PVP/PS | 407/379/1103/20 | 8 | 220 | 5 | 1000 | 3.73 | 74.68 | 0.69 |

EXAMPLES 130–149

The oxidation of polystyrene using non-bromide containing catalysts is given on Table 13. The feedstock was Aldrich polystyrene (18,242-7 Average Mw, 280,000). All metals were used as described previously. Ni was nickel(II); added as the acetate. NHPI is N-hydroxyphthalimide.

TABLE 13

Oxidation of Polystyrene (PS) using Non-bromide Containing catalysts

| Ex. | Feedstock | Catalyst, ppm | Water, % | Time, Hr/Temp, C./ Air Pressure, Psi | Polymer, Wgt % | Benzoic Acid Yield, Mol % | Benzil Yield, Mol % |
|---|---|---|---|---|---|---|---|
| 130 | PS | Co, 2950 | 0 | 5/140/1000 | 3.83 | 1.0 | 0.04 |
| 131 | PS | Co/Zr, 2950,47 | 0 | 5/140/1000 | 3.80 | 1.1 | 0.04 |
| 132 | PS | Co/Mn, 2950,137 | 0 | 5/140/1000 | 3.80 | 12.3 | 0.38 |
| 133 | PS | Co/Ce, 2950,250 | 0 | 5/140/1000 | 3.85 | 14.2 | 0.61 |
| 134 | PS | Co/Ni, 2950,250 | 0 | 5/140/1000 | 3.85 | 1.2 | 0.04 |
| 135 | PS | Ni, 2950 | 0 | 5/140/1000 | 3.82 | 0.2 | 0.01 |
| 136 | PS | Co/NHPI, 2950,200 | 0 | 5/140/1000 | 3.85 | 3.7 | 0.16 |
| 137 | PS | Co, 2950 | 0 | 5/140/1000 | 3.84 | 2.0 | 0.08 |
| 138 | PS | Co/Zr, 2950,47 | 0 | 5/140/1000 | 3.82 | 2.4 | 0.07 |
| 139 | PS | Co/Mn, 2950,137 | 0 | 5/140/1000 | 3.84 | 38.3 | 0.66 |
| 140 | PS | Co, 2950 | 0 | 5/180/1000 | 3.78 | 9.1 | 0.21 |
| 141 | PS | Co/Zr, 2950,47 | 0 | 5/180/1000 | 3.79 | 8.6 | 0.19 |
| 142 | PS | Co/Mn, 2950,137 | 0 | 5/180/1000 | 3.80 | 56.3 | 0.05 |
| 143 | PS | Co/Ce, 2950,250 | 0 | 5/180/1000 | 3.81 | 47.2 | 0.28 |
| 144 | PS | Co/Ni, 2950,250 | 0 | 5/180/1000 | 3.80 | 8.2 | 0.15 |
| 145 | PS | Ni, 2950 | 0 | 5/180/1000 | 3.89 | 1.2 | 0.09 |
| 146 | PS | Co/NHPI, 2950,200 | 0 | 5/180/1000 | 3.89 | 11.3 | 0.39 |
| 147 | PS | Co, 2950 | 0 | 5/180/1000 | 3.81 | 5.3 | 0.10 |
| 148 | PS | Co/Zr, 2950,47 | 0 | 5/180/1000 | 3.82 | 4.2 | 0.06 |
| 149 | PS | Co/Mn, 2950,137 | 0 | 5/180/1000 | 3.80 | 48.6 | 0.06 |

EXAMPLES 150–169

Polypropylene (PP) can be oxidized in water using vanadium (as ammonium metavanadate) and vanadium/bromide catalysts (bromide as 48 wgt % hydrobromic acid in water), see table 14. The same source of PP used in examples 98–105 were used in table 14. Yields to acetic acid as high as 50% are observed.

TABLE 14

Oxidation of Polypropylene (PP) to Acetic acid in Water Solvent using Vanadium and Vanadium Bromide Catalysts

| example | feedstock | catalyst | Catalyst conc., ppm | temp, C. | time, hr | [PP], wgt % | HOAc, yld, % |
|---|---|---|---|---|---|---|---|
| 150 | PP | V | 204 | 160 | 4 | 3.83 | 38.1 |
| 151 | PP | V | 4330 | 160 | 4 | 3.92 | 42.6 |
| 152 | PP | V/Br | 204/300 | 160 | 4 | 3.78 | 38.8 |
| 153 | PP | V/Br | 1019/4330 | 160 | 4 | 3.80 | 42.2 |
| 154 | PP | V/Br | 1600/6800 | 160 | 4 | 3.82 | 46.3 |
| 155 | PP | V | 204 | 180 | 4 | 3.75 | 42.2 |
| 156 | PP | V | 4330 | 180 | 4 | 3.82 | 42.1 |
| 157 | PP | V/Br | 204/300 | 180 | 4 | 3.91 | 38.7 |
| 158 | PP | V/Br | 1019/4330 | 180 | 4 | 3.90 | 35.0 |
| 159 | Pp | V/Br | 1600/6800 | 180 | 4 | 3.78 | 52.0 |
| 160 | PP | V | 204 | 220 | 2 | 3.93 | 36.1 |
| 161 | PP | V | 4330 | 220 | 2 | 3.80 | 39.8 |
| 162 | PP | V/Br | 204/300 | 220 | 2 | 3.77 | 43.3 |
| 163 | PP | V/Br | 1019/4330 | 220 | 2 | 3.78 | 44.5 |
| 164 | PP | V/Br | 1600/6800 | 220 | 2 | 3.76 | 49.8 |
| 165 | PP | V | 204 | 220 | 4 | 3.89 | 35.7 |

TABLE 14-continued

Oxidation of Polypropylene (PP) to Acetic acid in Water Solvent using Vanadium and Vanadium Bromide Catalysts

| example | feedstock | catalyst | Catalyst conc., ppm | temp, C. | time, hr | [PP], wgt % | HOAc, yld, % |
|---|---|---|---|---|---|---|---|
| 166 | PP | V | 4330 | 220 | 4 | 3.82 | 35.7 |
| 167 | PP | V/Br | 204/300 | 220 | 4 | 3.89 | 40.9 |
| 168 | PP | V/Br | 1019/4330 | 220 | 4 | 3.86 | 44.3 |
| 169 | PP | V/Br | 1600/6800 | 220 | 4 | 3.77 | 50.7 |

EXAMPLES 170–182

Polyethylene can be oxidized in water using vanadium (as ammonium metavanadate) and vanadium/bromide catalysts (bromide as 48 wgt % hydrobromic acid in water), see table 15. The same source of PE used in examples 106–113 were used in Table 15.

TABLE 15

Oxidation of Polyethylene (PE) to Succinic, Glutaric and Adipic acid in Water Solvent using Vanadium and Vanadium Bromide Catalysts

| Exa, | reagent | catalyst | catalyst conc., ppm | temp, C. | time, hr | PE, wgt % | succinic yld, % | glutaric, yld % | adipic, yld. % |
|---|---|---|---|---|---|---|---|---|---|
| 170 | PE | V | 12990 | 180 | 2.0 | 3.8 | 7.2 | 14.0 | 8.6 |
| 171 | PE | V/Br | 204/300 | 150 | 8.0 | 3.8 | 9.7 | 5.6 | 7.8 |
| 172 | PE | V | 4330 | 200 | 1.0 | 3.8 | 6.3 | 7.2 | 8.6 |
| 173 | PE | V | 204 | 150 | 2.0 | 3.8 | 7.4 | 6.5 | 8.1 |
| 174 | PE | V | 4330 | 150 | 4.0 | 3.8 | 6.2 | 9.0 | 5.6 |
| 175 | PE | V/Br | 4330/23650 | 200 | 2.0 | 7.5 | 15.2 | 1.6 | 3.4 |
| 176 | PE | V/Br | 300/204 | 180 | 2.0 | 3.8 | 8.9 | 4.7 | 5.9 |
| 177 | PE | V | 204 | 150 | 8.0 | 3.8 | 9.3 | 5.4 | 4.6 |
| 178 | PE | V | 204 | 150 | 6.0 | 3.8 | 9.1 | 5.7 | 4.5 |
| 179 | PE | V | 4330 | 180 | 2.0 | 3.8 | 6.5 | 5.8 | 6.5 |
| 180 | PE | V | 4330 | 200 | 2.0 | 3.8 | 12.3 | 6.5 | 0.0 |
| 181 | PE | V | 12990 | 200 | 1.0 | 3.8 | 5.9 | 12.5 | 0.0 |
| 182 | PE | V | 204 | 150 | 4.0 | 3.8 | 4.4 | 13.9 | 0.0 |

EXAMPLES 183–184

Polyethylene can be oxidized in a 20 wgt % acetic acid-80 wgt % ortho-dichlorobenzene solution using a cobalt, manganese, bromine catalyst. 5 wgt % of PE was dissolved in this mixture by heating. It was subsequently oxidized in air, see Table 16. The same source of PE used in examples 106-113 was used in table 16.

TABLE 16

Oxidation of Polyethylene (PE) to Succinic, Glutaric and Adipic acid in 20% acetic acid/Ortho-dichlorobenzene solvent using a Co/Mn/Br catalyst

| Example | feedstock | catalyst | catalyst conc., ppm | temp, C. | time, hr | PE, wgt % | succinic acid yld, % | glutaric acid, yld % | adipic acid, yld. % |
|---|---|---|---|---|---|---|---|---|---|
| 183 | PE | Co/Mn/Zr/Br | 589/549/1598/93 | 150 | 6.0 | 2.0 | 0.0 | 10.7 | 9.3 |
| 184 | PE | Co/Mn/Zr/Br | 589/549/1598/93 | 150 | 8.0 | 2.0 | 12.3 | 15.8 | 10.7 |

EXAMPLES 185–190

Polyvinylchloride (PVC) can be oxidized in water using vanadium (as ammonium metavanadate) and vanadium/bromide catalysts (bromide as 48 wgt % hydrobromic acid in water), see table 17. The same source of PVC was used in examples 114–115 was used in table 17.

TABLE 17

Oxidation of Polyvinylchloride (PVC) to Formic, Glycolic, Succinic and Adipic acids in Water Solvent using Vanadium and Vanadium Bromide Catalysts

| ex. | reagent | catalyst | catalyst conc., ppm | time, hr | temp, C. | [PVC], wgt % | formic acid, yld, % | glycolic acid, yld, % | succinic acid, yld, % | adipic acid, yld, % |
|-----|---------|----------|---------------------|----------|----------|--------------|---------------------|-----------------------|-----------------------|---------------------|
| 185 | PVC | Co/Mn/Br | 1179/1099/3196 | 2 | 200 | 7.61 | 2.87 | 9.00 | 1.8 | 0.00 |
| 186 | PVC | V/Br | 4330/23650 | 2 | 200 | 7.60 | 1.06 | 9.00 | 30.8 | 1.27 |
| 187 | PVC | Co | 7366 | 4 | 200 | 7.65 | 3.82 | 0.08 | 8.8 | 1.74 |
| 188 | PVC | Co/Mn/Br | 1179/1099/3196 | 4 | 200 | 7.66 | 2.46 | 0.44 | 5.9 | 1.15 |
| 189 | PVC | HBr | 23650 | 4 | 200 | 7.63 | 0.69 | 0.86 | 2.9 | 1.75 |
| 190 | PVC | V/Br | 4330/23650 | 4 | 200 | 7.59 | 0.71 | 0.00 | 38.4 | 1.34 |

What is claimed is:

1. A process for the oxidation of polymeric material comprising contacting the polymeric material with an oxidant in the presence of a homogenous metal-catalyst under conditions promoting oxidation of the backbone of the polymeric material to produce monomers of the polymeric material or oxidized derivatives thereof.

2. The process of claim 1 wherein the metal catalyst comprises at least one metal selected from the group consisting of Ti, V, Cr, Mn, Fe, Co, Ni, Cu, Zr, Ag, Hf, Ru, Te, Mo, Zn and Ce.

3. The process of claim 2 wherein the metal catalyst comprises at least one metal selected from the group consisting of Co, Mn, Ce, Zr and Ni.

4. The process of claim 3 wherein the metal catalyst comprises at least one metal selected from group consisting of Co, Ni and V.

5. The process of claim 2 wherein the metal catalyst is in the form of a metal acetate.

6. The process of claim 1 wherein the metal catalyst further comprises a source of bromide.

7. The process of claim 6 wherein the metal catalyst comprises at least one metal selected from the group consisting of Ti, V, Cr, Mn, Fe, Co, Ni, Cu, Zr, Ag, Hf, Ru, Te, Mo, Zn and Ce.

8. The process of claim 7 wherein the metal catalyst comprises at least one metal selected from the group consisting of Co, Mn and V.

9. The process of claim 8 further comprising Zr.

10. The process of claim 7 wherein the metal catalyst comprises Co and Mn.

11. The process of claim 10 further comprising Zr.

12. The process of claim 7 wherein the oxidant is selected from the group consisting of air, oxygen and peroxide.

13. The process of claim 12 wherein the oxidant is air.

14. The process of claim 7 wherein the process is run in a solvent or solvent mixture comprised of at least one aliphatic $C_2$–$C_6$ monocarboxylic acid compound.

15. The process of claim 14 wherein the process is run in acetic acid.

16. The process of claim 1 wherein the polymeric material is selected from the group consisting of polyamide, polyester, polyolefin, polyvinylchloride, polycarbonate, and copolymers and blends thereof.

17. The process of claim 16 wherein the polymeric material is selected from the group consisting of polyester, polyolefin, polyvinylchloride, polycarbonate and copolymers and blends thereof.

18. The process of claim 7 wherein the metal catalyst is in a form selected from the group consisting of metal carbonate, metal acetate, metal acetate tetrahydrate and metal bromide.

19. The process of claim 18 wherein the metal catalyst is in the form of a metal acetate tetrahydrate.

20. The process of claim 7 wherein the source of bromide is selected from the group consisting of sodium bromide and hydrobromic acid.

21. The process of claim 7 wherein the process is run in water.

* * * * *